United States Patent [19]
Kaul et al.

[11] Patent Number: 5,731,422
[45] Date of Patent: Mar. 24, 1998

[54] 2:1 ALUMINUM COMPLEXES OF MONOAZO COMPOUNDS

[75] Inventors: Bansi Lal Kaul, Biel-Benken, Switzerland; Dominique Pflieger, Tagsdorf, France

[73] Assignee: Clariant Finance (BVI) Limited, Tortola, Virgin Islands (Br.)

[21] Appl. No.: 472,044

[22] Filed: Jun. 6, 1995

Related U.S. Application Data

[63] Continuation of Ser. No. 307,991, Sep. 14, 1994, abandoned, which is a continuation of Ser. No. 210,809, Mar. 18, 1994, abandoned, which is a continuation of Ser. No. 69,240, May 28, 1993, abandoned, which is a continuation of Ser. No. 940,559, Sep. 4, 1992, abandoned.

[30] Foreign Application Priority Data

Sep. 5, 1991 [DE] Germany .................. 41 29 489.0

[51] Int. Cl.$^6$ .................. C09B 45/22; C09D 101/08
[52] U.S. Cl. .................. 534/693; 534/700; 534/711; 534/723; 524/105; 524/190
[58] Field of Search .................. 534/693, 700, 534/711, 723

[56] References Cited

U.S. PATENT DOCUMENTS

| | | | |
|---|---|---|---|
| 1,895,559 | 1/1933 | Straub | 534/713 |
| 2,791,513 | 5/1957 | Siegel et al. | 106/402 |
| 2,814,614 | 11/1957 | Zickendraht | 534/693 |
| 3,562,249 | 2/1971 | Schnabel et al. | 534/820 |
| 3,878,158 | 4/1975 | Brouard et al. | 534/693 |
| 3,994,872 | 11/1976 | Kuster | 534/693 X |
| 4,041,054 | 8/1977 | Hahnke et al. | 552/110 |
| 4,045,423 | 8/1977 | Brouard et al. | 534/693 |
| 4,248,635 | 2/1981 | Henning et al. | 106/22 K |
| 4,287,481 | 9/1981 | Kleinerman | 372/53 |
| 4,294,749 | 10/1981 | Papenfuhs et al. | 524/237 |
| 4,322,529 | 3/1982 | Kuster | 544/343 |
| 4,427,585 | 1/1984 | Beffa | 534/693 |

FOREIGN PATENT DOCUMENTS

| | | |
|---|---|---|
| 275716 | 11/1969 | Austria . |
| 275718 | 11/1969 | Austria . |
| 670259 | 1/1939 | Germany . |
| 718408 | 3/1942 | Germany . |
| 821977 | 11/1951 | Germany . |
| 3543512 | 6/1987 | Germany . |
| 145842 | 1/1931 | Switzerland . |
| 145845 | 1/1931 | Switzerland . |
| 167047 | 4/1934 | Switzerland . |
| 167051 | 4/1934 | Switzerland . |
| 944409 | 12/1963 | United Kingdom . |
| 994388 | 6/1965 | United Kingdom . |
| 1019000 | 2/1966 | United Kingdom . |

OTHER PUBLICATIONS

Kirby et al., Anal. Chim. Acta. 26(1962), 458–469.
Evans et al., J. Chem. Soc. Dalton Trans. 1990, 3773–3779.

*Primary Examiner*—Fiona T. Powers
*Attorney, Agent, or Firm*—Gabriel Lopez; Melvyn M. Kassenoff

[57] ABSTRACT

Complexes of formulae I and II

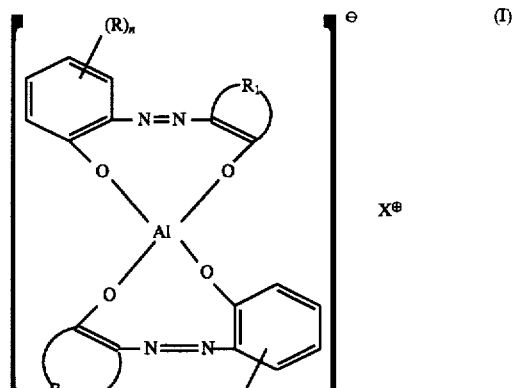

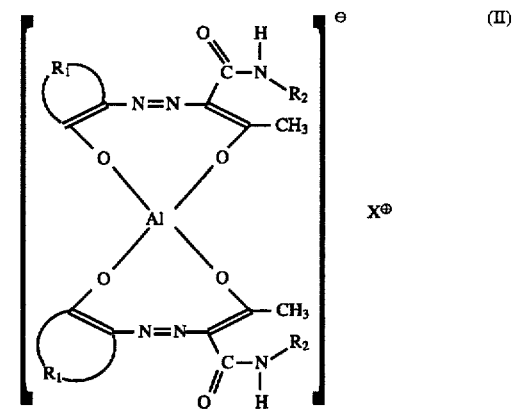

wherein the variables are as defined in the specification are useful as dyes for, for example, the mass dyeing of plastics and for lacquers.

24 Claims, No Drawings

2:1 ALUMINUM COMPLEXES OF MONOAZO COMPOUNDS

This is a continuation of application Ser. No. 08/307,991, filed Sep. 14, 1994 and now abandoned, which is a continuation of application Ser.No. 08/210,809, filed Mar. 18, 1994 and now abandoned, which is a continuation of application Ser. No. 08/069,240, filed May 28, 1993 and now abandoned, which is a continuation of application Ser. No. 07/940,559, filed Sep. 4, 1992 and now abandoned.

The invention relates to new aluminium complex-water solubilizing group-free compounds suitable as dyestuffs.

According to the invention, there is provided complexes of formulae I and II

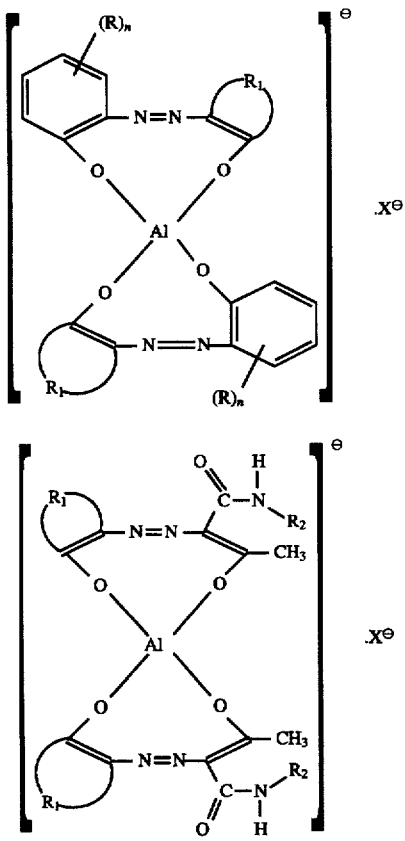

in which
each n independently is 1 or 2;
each $R_1$ independently together with the —C=C— group to which it is attached forms a single or fused aromatic or heteroaromatic ring system that is substituted or unsubstituted;

each R independently is selected from $C_{1-4}$alkyl, $C_{1-4}$alkoxy, cyano, —SCN, ($C_{1-4}$alkoxy) carbonyl, benzoyl, phenoxycarbonyl, aminocarbonyl, mono ($C_{1-4}$alkyl)aminocarbonyl, di($C_{1-4}$alkyl) aminocarbonyl, mono-($C_{1-4}$alkoxy)-$C_{2-4}$alkyl aminocarbonyl, di($C_{1-4}$alkoxy-$C_{2-4}$alkyl)aminocarbonyl, phenylaminocarbonyl, aminosulphonyl, mono- and di-substituted sulphamoyl each substituent of which is independently $C_{1-4}$alkyl, ($C_{1-4}$alkoxy) $C_{2-4}$alkyl or phenyl; and provided neither group $R_1$ in the compound of formula I is an unsubstituted 1-phenyl-3-methylpyrazolyl group, R may additionally be nitro;

each $R_2$ independently is unsubstituted or substituted phenyl, $C_{1-12}$alkyl or $C_{1-4}$alkoxy-$C_{2-8}$alkyl; and $X^+$ is a cation.

Preferred single or fused ring systems of $R_1$ are those of the benzene series, the naphthalene series and the heteroaromatic series. Preferred heteroaromatic groups comprise five or six membered nitrogen and/or sulphur containing rings, most preferably of the pyrazolone or pyridone series.

Preferred substitutents by which any aromatic groups of $R_1$ or $R_2$ can be substituted are selected from halogen (preferably Cl and Br), OH, $C_{1-4}$alkyl, $C_{1-4}$alkoxy, cyano, —NO$_2$, $C_{1-4}$alkylcarbonyl, SCN, $C_{1-4}$alkoxycarbonyl, benzoyl, phenoxycarbonyl, $C_{1-4}$alkylcarbonyl-oxy, aminocarbonyl, mono($C_{1-4}$alkyl)aminocarbonyl, di($C_{1-4}$alkyl)aminocarbonyl, mono ($C_{1-4}$alkoxy-$C_{2-4}$alkyl) aminocarbonyl, di($C_{1-4}$alkoxy-$C_{2-4}$alkyl)aminocarbonyl, aminosulphonyl, mono($C_{1-4}$alkyl)aminosulphonyl, di($C_{1-4}$alkyl)aminosulphonyl, mono($C_{1-4}$alkoxy-$C_{2-4}$alkyl)-amino sulphonyl, di($C_{1-4}$alkoxy $C_{2-4}$alkyl) amino sulphonyl and phenylaminosulphonyl.

More preferred substituents on the aromatic groups of $R_1$ or $R_2$ are halogen (chloro or bromo) $C_{1-4}$alkyl, $C_{1-4}$alkoxy acetyl.

Preferably $X^+$ is $X_1^+$ where $X_1^+$ is selected from alkali metal ions (especially Na$^+$ and K$^+$), ammonium, mono $C_{1-4}$alkyl, ammonium, di($C_{1-4}$alkyl)ammonium, tri($C_{1-4}$alkyl)ammonium and (most preferred) 4-amino-2,2,6,6-tetra-alkylpipeddinium, 4-hydroxy-2,2,6,6-tetraalkylpiperidinium and 4-keto-2,2,6,6-tetraalkylpiperidinium.

More preferably $X^+$ is $X_2^+$ where $X_2^+$ is sodium, potassium, ammonium, 4-amino-2,2,6,6-tetramethylpiperidinium, 4-hydroxy-2,2,6,6-tetramethylpiperidinium or 4-keto-2,2,6,6-tetramethylpiperidinium.

Preferred complexes of formula I are of formulae Ia and Ib

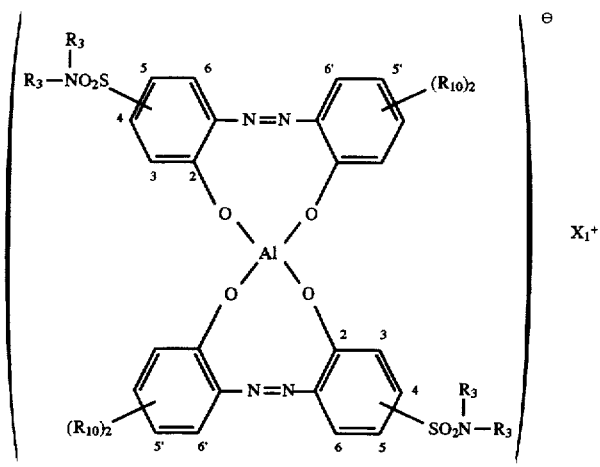

(Ia)

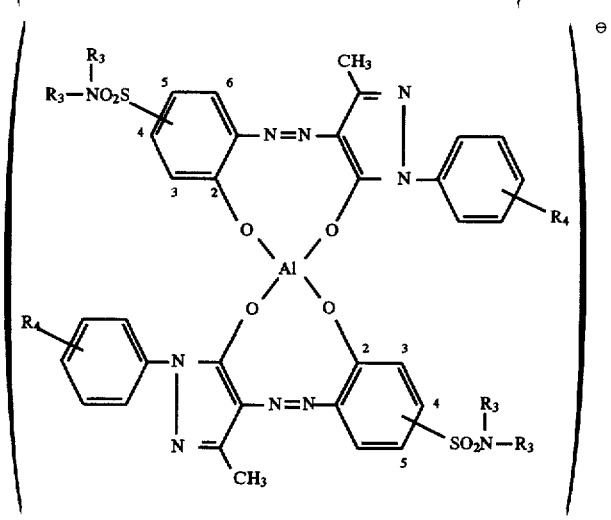

(Ib)

in which each $R_{10}$ independently is selected from hydrogen, halogen, hydroxy, $C_{1-4}$alkyl, $C_{1-4}$alkoxy, acetyl, benzoyl and 4,6-bis(2',4'-dimethylphenyl)-triazinyl-2 or both groups $R_{10}$ together with the phenyl ring to which they are attached form a naphthyl group (preferably in 5' and 6' position);

each $R_3$ independently is hydrogen, $C_{1-4}$alkyl, $C_{1-2}$alkoxy-$C_{2-3}$alkyl or phenyl, $R_4$ is hydrogen, halogen, methyl, ethyl, methoxy or ethoxy and $X^+_1$ is as defined above.

Preferred complexes of formula II are of formula IIa

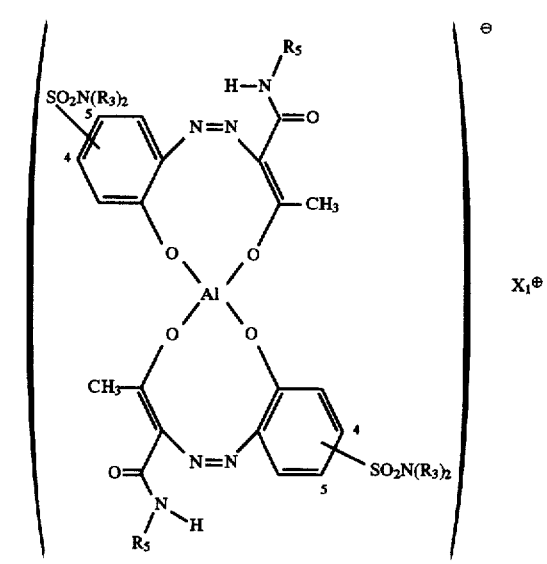

in which each $R_3$ independently is hydrogen, $C_{1-4}$alkyl, $C_{1-2}$alkoxy-$C_{2-3}$alkyl or phenyl, and each $R_5$ independently is a 2-ethylhexyl or a phenyl group, unsubstituted or substituted by 1 to 3 substituents selected from chloro, bromo, $C_{1-4}$alkyl, $C_{1-4}$alkoxy and acetyl (or preferably one or two $C_{1-2}$alkoxy groups and/or one chloro or bromo atom or one methyl group, especially one or two methoxy groups).

Preferably in the complexes of the invention the —$SO_2NH$—$R_3$ groups are in the 4- or 5-positions.

Preferably $R_{10}$ is $R_{10}'$ where each $R_{10}'$ independently is selected from hydrogen, hydroxyl, acetyl and benzoyl.

Complexes of formula I can be prepared by known methods for producing 2:1 metal complex dyes, for example by coupling a diazotized amine of formula III

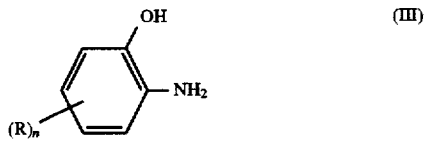

with a compound of formula IV

where R and $R_1$ are as defined above, followed by metallization and introduction of the cation.

Compounds of formula II can be prepared by known methods for producing 2:1 metal complex dyes for example by coupling a diazotized compound of formula V

with a compound of formula VI

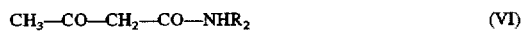

where $R_1$ and $R_2$ are as defined above, followed by metallization and introduction of the cation.

Metallization and introduction of the cation in compounds of formula I or II can also occur at the stage of forming the reactants (compounds of formula III and IV or V and VI respectively).

The new complexes of formulae I and II (hereinafter the new complexes) are good for dyeing (especially for dyeing in the mass) of plastic materials including solvent-free and solvent-containing plastic masses and solvent-free or solvent containing plastic resins, for example in finishes based on oil or water based paints, in various lacquers, in spin dyeing of viscose or cellulose acetate, for dyeing of natural or synthetic polyamides, polyester, polyethylene, polystyrene, polyvinylchloride, rubber and synthetic leather. The new complexes can be used for printing of graphic material, for dyeing of paper masses, for coating of textile and leather or for printing uses.

In particular, the new complexes can be used in an ecologically beneficial way to print for example, aluminum foils used for packaging. This enables the aluminium to be recycled easily. Therefore the new complexes are useful in reducing waste that results from recycling and for reducing the amount of harmful products.

Dyeings with the new complexes have good properties generally, for example good heat withstanding properties, good light and weathering properties, good chemical resistance, good migration properties, low blooming, good overcoating properties, good fastness in solvent properties, good dyeing strength and good application properties (e.g. flocculation fastness).

Dyeing, printing and padding can be carded out with the new complexes on substrates by known methods.

The invention will now be illustrated by the following Examples.

EXAMPLE 1 a) 26.0 parts of 2-aminophenol-4-(3'-methoxypropylamino-sulphonyl) are stirred into a mixture of 200 parts of water and 70 parts of 30% HCl. After the addition of 50 parts of ice, the amine is diazotized by the addition of 26.2 parts by volume of 4N $NaNO_2$ solution. The resulting suspension is stirred for 3 hours at 0° C., is poured into a solution of 13.7 parts of β-naphthol in 190 parts of water and 9.5 parts of 30% NaOH are slowly added. By the simultaneous addition of a further 70 parts of 30% NaOH, the pH is brought to 9.5–10. The resulting mixture is then stirred at room temperature for 8 hours and brought to pH 1.5 by the addition of 30% HCl. The resulting precipitate is filtered, washed with 4000 parts of water and dried.

b) 44.19 parts of the monoazo dyestuff of part a) above are suspended in a mixture of 110 parts of water and 25 parts of 30% NaOH. This is warmed to 70° C. and stirred for 1 hour. The pH value of the suspension is 12.3. After further warming to 90° C., over 1 hours a solution of 17.1 parts of aluminium sulphate (water free) in 340 parts of water is added, whereby a voluminous suspension of the aluminium complex results and the pH value sinks to 10.9. The temperature is allowed to sink to 45° C. over 2 hours (while stirring well) and the suspension is slowly reacted with a solution of 8.58 parts of triacetondiamine in 10 parts of water and 11.2 parts of 30% HCl. The resulting precipitate is brought to pH 5.4 by the addition of above 2.4 parts of HCl. The mixture is stirred a further hour at room temperature, filtered and the residue is washed salt-free and then dried. A compound of formula Ia

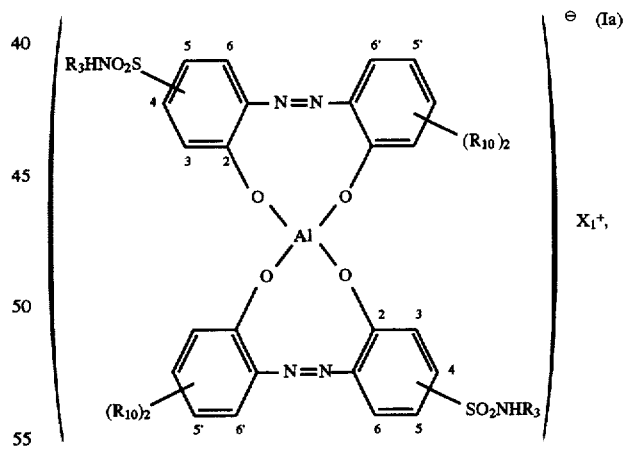

in which $R_3$ is methoxypropyl, both groups $R_{10}$ together with the phenyl group to which they are attached form a naphthyl group (5',6' position) and the sulphonamide groups are in the 5- positions.

The resulting dye dyes plastics material a bluish-red nuance and has a solubility in ethanol of about 100 g/l.

EXAMPLE 2

By a method analogous to that of Example 1, 12.12 parts of 2-hydroxy-4-methylaminosulphonylaniline are diazotized and then coupled with 1-phenyl-3-methylpyrazolane-5 and then heated with aluminum sulphate, NaOH and triacetondiaminochlorohydrate to form the resulting 2:1 aluminum complex of formula Ib

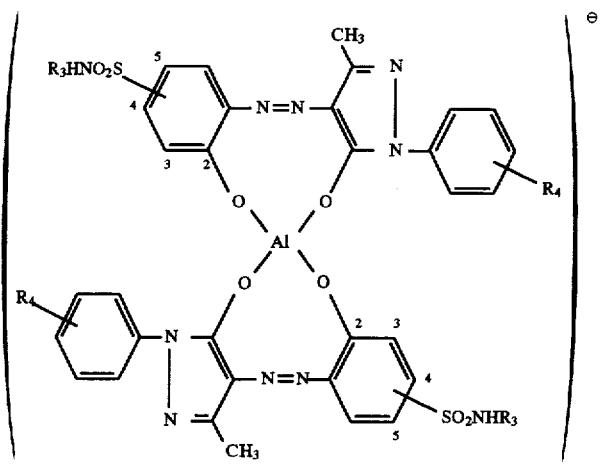

in which R$_3$ is methyl;

R$_4$ is hydrogen and the sulponamide group is in the 4-position.

EXAMPLE 3

26.4 parts of 2-hydroxy-4-phenylaminosulphonylaniline are stirred into a solution of 350 parts of water and 50 parts of 30% HCl. After the addition of 100 parts of ice, the amine is diazotized with 27 parts by volume of 4N NaNO$_2$ solution. After stirring for 3 hours at 0° C., the resulting diazonium salt solution is slowly added to a mixture of 12.5 parts of 2,5-dimethoxyacetylacetanilide, 9.3 parts of 2-methoxyacetoacetylanilide, 9 parts of 30% NaOH solution, 150 parts of water, 9 parts of glacial acetic acid and 100 parts of ice. The pH is held at 4.5 by the addition of 35 parts of 30% NaOH.

Finally the resulting monoazo dyestuff, analogously to the process of Example 1 is reacted with 30% NaOH, aluminum sulphate and triacetonamine to form a 2:1 aluminum complex dyestuff of formula IIa

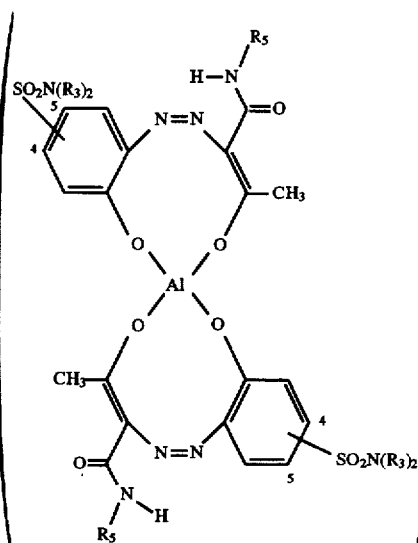

in which

R$_3$ is phenyl

R$_5$ is 2,5-dimethoxyphenyl (and 2-monomethoxy phenyl) and the sulphonamide groups are in the 4- positions.

The resulting dyestuff colors nitrocellulose lacquers a yellow tone.

EXAMPLES 4–21

Complexes of formula 1

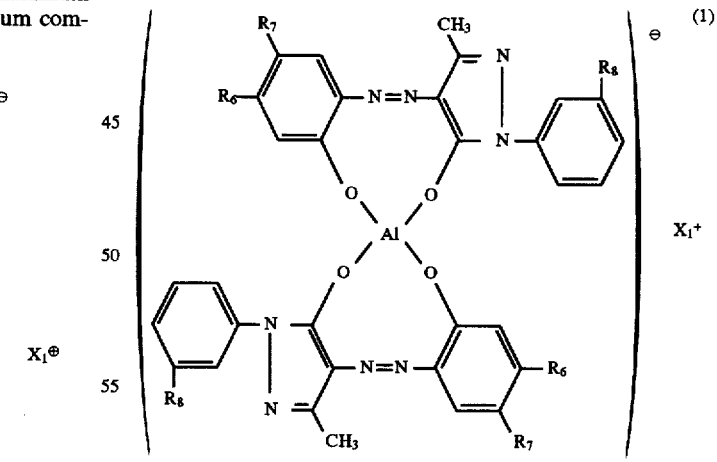

in which the symbols are defined in Table 1 below can be prepared from appropriate reactants by a method analogous to any one of Example 1–3 above.

The nuances of dyeings with the dyes of Example 4–21 in nitrocellulose lacquer are reddish yellow.

TABLE 1

| Example No. | $R_6$ | $R_7$ | $R_8$ | $X_1^+$ |
|---|---|---|---|---|
| 4 | —SO$_2$NHC$_6$H$_5$ | H | H | 1) |
| 5 | H | —SO$_2$NHCH$_3$ | H | 1) |
| 6 | H | " | H | 2) |
| 7 | —SO$_2$NHC$_6$H$_5$ | H | H | 2) |
| 8 | —SO$_2$NH(CH$_2$)$_3$OCH$_3$ | H | H | 2) |
| 9 | H | —SO$_2$NH(CH$_2$)$_3$OCH$_3$ | H | 2) |
| 10 | H | " | H | 1) |
| 11 | H | —SO$_2$NHC$_6$H$_5$ | H | 1) |
| 12 | H | " | H | 3) |
| 13 | —SO$_2$NHCH$_3$ | H | H | 2) |
| 14 | " | H | H | 3) |
| 15 | " | H | —OCH$_3$ | 1) |
| 16 | —SO$_2$NHC$_6$H$_5$ | H | H | 3) |
| 17 | H | —SO$_2$NHCH$_3$ | H | 3) |
| 18 | H | " | H | Na |
| 19 | H | " | —CH$_3$ | 1) |
| 20 | H | " | Cl | 4) |
| 21 | —SO$_2$NHCH$_3$ | H | —OCH$_3$ | 5) | where in the $X_1^+$ column of Tables 1–4, the cation $X_1^+$ is as follows:

1) =
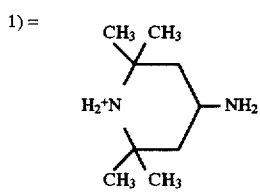

2) =
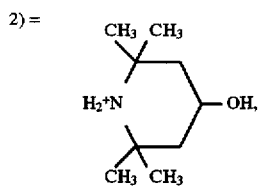

3) =
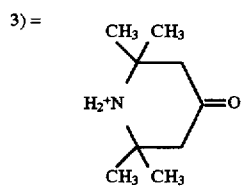

4)=monoethanolammonium

5)=ethylhexylammonium

Complexes of formula 2

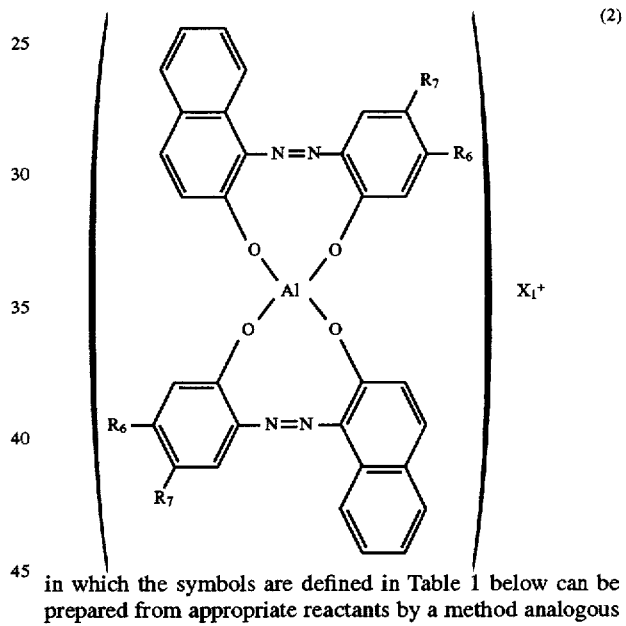

(2)

in which the symbols are defined in Table 1 below can be prepared from appropriate reactants by a method analogous to any one of Example 1–3 above.

The nuances of dyeings with the dyes of Example 22–43 in nitrocellulose lacquer are bluish red.

TABLE 2

| Example No. | $R_6$ | $R_7$ | $X_1^+$ |
|---|---|---|---|
| 22 | —SO$_2$NH(CH$_2$)$_3$OCH$_3$ | H | 1) |
| 23 | " | H | 3) |
| 24 | —SO$_2$NHC$_6$H$_5$ | H | 1) |
| 25 | " | H | 2) |
| 26 | " | H | 3) |
| 27 | —SO$_2$NHCH$_3$ | H | 1) |
| 28 | " | H | 2) |
| 29 | " | H | 3) |
| 30 | " | H | 4) |
| 31 | " | H | 5) |
| 32 | H | —SO$_2$NHC$_6$H$_5$ | 1) |
| 33 | H | " | 2) |
| 34 | H | " | 3) |
| 35 | H | " | Na |
| 36 | H | —SO$_2$NH(CH$_2$)$_3$OCH$_3$ | K |

TABLE 2-continued

| Example No. | $R_6$ | $R_7$ | $X_1^+$ |
|---|---|---|---|
| 37 | H | " | 2) |
| 38 | H | " | 3) |
| 39 | H | " | 4) |
| 40 | H | —SO$_2$NHCH$_3$ | 1) |
| 41 | H | " | 2) |
| 42 | H | " | 3) |
| 43 | H | " | K |

EXAMPLES 44–79
Compounds of formula 3

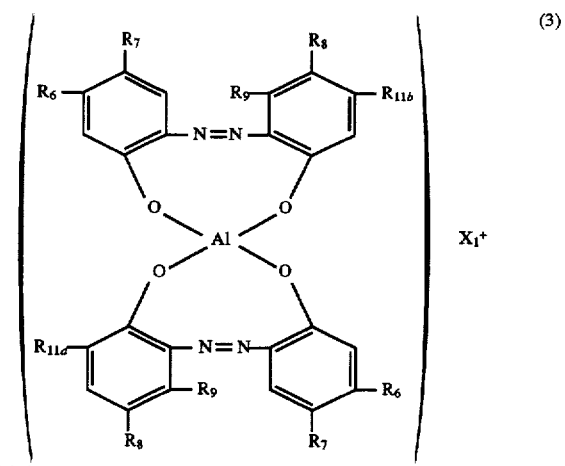

(3)

which are always mixtures wherein one of $R_9$ and $R_{11a}$ on a phenyl ring is OH and the other is hydrogen and the other symbols are defined in Table 3 can be prepared analogously to any one of the methods of Examples 1 to 3 from known compounds. These dyes dye nitrocellulose lacquers a red nuance.

TABLE 3

| Example No. | $R_6$ | $R_7$ | $R_8$ | $X_1^+$ |
|---|---|---|---|---|
| 44 | —SO$_2$NHCH$_3$ | H | —COCH$_3$ | 1) |
| 45 | " | H | —COC$_6$H$_5$ | 1) |
| 46 | " | H | " | 2) |
| 47 | " | H | " | 3) |
| 48 | —SO$_2$NHC$_6$H$_5$ | H | " | 3) |
| 49 | " | H | " | 1) |
| 50 | " | H | " | 2) |
| 51 | —SO$_2$NH(CH$_2$)$_3$OCH$_3$ | H | " | 1) |
| 52 | " | H | " | 2) |
| 53 | " | H | " | 3) |
| 54 | H | —SO$_2$NHCH$_3$ | " | Na |
| 55 | H | " | " | 2) |
| 56 | H | " | " | 2) |
| 57 | H | " | " | 4) |
| 58 | H | —SO$_2$NHC$_6$H$_5$ | " | 1) |
| 59 | H | " | " | 2) |
| 60 | H | " | " | 3) |
| 61 | H | —SO$_2$NH(CH$_2$)$_3$OCH$_3$ | " | 1) |
| 62 | H | —SO$_2$NH(CH$_2$)$_3$OCH$_3$ | —COC$_6$H$_5$ | 2) |
| 63 | H | " | " | 3) |
| 64 | —SO$_2$NHCH$_3$ | H | 2,4-Bis-(2',4'-dimethylphenyl)-triazinyl-6 | 1) |
| 65 | —SO$_2$NHC$_6$H$_5$ | H | 2,4-Bis-(2',4'-dimethylphenyl)-triazinyl-6 | 1) |
| 66 | " | H | 2,4-Bis-(2',4'-dimethylphenyl)-triazinyl-6 | 2) |
| 67 | " | H | 2,4-Bis-(2',4'-dimethylphenyl)-triazinyl-6 | 3) |
| 68 | " | H | 2,4-Bis-(2',4'-dimethylphenyl)-triazinyl-6 | Na |
| 69 | —SO$_2$NH(CH$_2$)$_3$OCH$_3$ | H | 2,4-Bis-(2',4'-dimethylphenyl)-triazinyl-6 | 1) |
| 70 | " | H | 2,4-Bis-(2',4'-dimethylphenyl)-triazinyl-6 | 2) |
| 71 | " | H | 2,4-Bis-(2',4'-dimethylphenyl)- | 3) |

TABLE 3-continued

| Example No. | $R_6$ | $R_7$ | $R_8$ | $X_1^+$ |
|---|---|---|---|---|
| 72 | H | —SO$_2$NHCH$_3$ | 2,4-Bis-(2',4'-dimethylphenyl)-triazinyl-6 | 1) |
| 73 | H | " | 2,4-Bis-(2',4'-dimethylphenyl)-triazinyl-6 | 2) |
| 74 | H | " | 2,4-Bis-(2',4'-dimethylphenyl)-triazinyl-6 | 3) |
| 75 | H | —SO$_2$NHC$_6$H$_5$ | 2,4-Bis-(2',4'-dimethylphenyl)-triazinyl-6 | 1) |
| 76 | H | " | 2,4-Bis-(2',4'-dimethylphenyl)-triazinyl-6 | 2) |
| 77 | H | " | 2,4-Bis-(2',4'-dimethylphenyl)-triazinyl-6 | 3) |
| 78 | H | " | 2,4-Bis-(2',4'-dimethylphenyl)-triazinyl-6 | 4) |
| 79 | H | " | 2,4-Bis-(2',4'-dimethylphenyl)-triazinyl-6 | 5) |

EXAMPLES 80–126

Complexes of formula 4

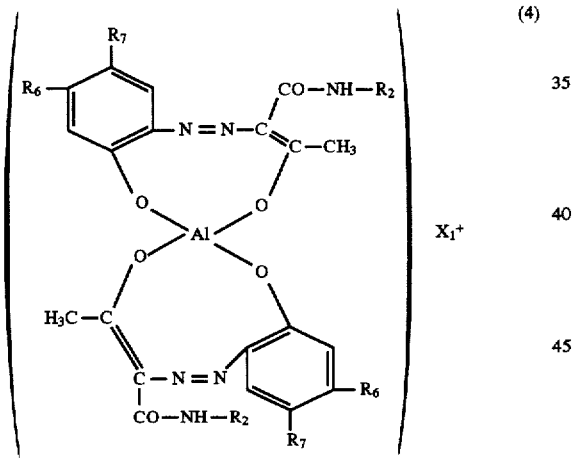

(4)

in which the symbols are defined in Table 4 below can be made from known compounds by a method analogous to any one of Examples 1 to 3. These dyes color nitrocellulose a yellow nuance.

TABLE 4

| Example No. | $R_2$ | $R_6$ | $R_7$ | $X_1^+$ |
|---|---|---|---|---|
| 80 | 2,5-dimethoxyphenyl | H | —SO$_2$NHCH$_3$ | 1) |
| 81 | " | H | " | 2) |
| 82 | " | H | " | 3) |
| 83 | " | H | " | Na |
| 84 | " | H | " | 4) |
| 85 | " | H | " | 5) |
| 86 | 2,5-dimethoxyphenyl | H | —SO$_2$NHC$_6$H$_5$ | 1) |
| 87 | " | H | " | 2) |
| 88 | " | H | " | 3) |
| 89 | " | H | —SO$_2$NH(CH$_2$)$_3$OCH$_3$ | 1) |
| 90 | " | H | " | 2) |
| 91 | " | —SO$_2$NHCH$_3$ | H | 2) |
| 92 | " | " | H | 3) |

TABLE 4-continued

| Example No. | $R_2$ | $R_6$ | $R_7$ | $X_1^+$ |
|---|---|---|---|---|
| 93 | " | —SO$_2$NHC$_6$H$_5$ | H | 1) |
| 94 | " | " | H | 1) |
| 95 | " | —SO$_2$NH(CH$_2$)$_3$OCH$_3$ | H | 1) |
| 96 | " | " | H | 2) |
| 97 | 2-methoxyphenyl | " | H | 1) |
| 98 | " | H | —SO$_2$NHCH$_3$ | 1) |
| 99 | " | H | " | 2) |
| 100 | " | H | " | 3) |
| 101 | " | H | —SO$_2$NHC$_6$H$_5$ | 1) |
| 102 | " | H | " | 2) |
| 103 | " | H | " | 1) |
| 104 | " | H | —SO$_2$NH(CH$_2$)$_3$OCH$_3$ | 1) |
| 105 | 2-methoxyphenyl | H | —SO$_2$NH(CH$_2$)$_3$OCH$_3$ | 3) |
| 106 | 2-ethylhexyl | H | —SO$_2$NHCH$_3$ | 1) |
| 107 | " | H | " | 2) |
| 108 | " | H | " | 3) |
| 109 | " | H | —SO$_2$NHC$_6$H$_5$ | 1) |
| 110 | " | H | " | 2) |
| 111 | " | H | " | 3) |
| 112 | " | H | —SO$_2$NH(CH$_2$)$_3$OCH$_3$ | 1) |
| 113 | " | H | " | 2) |
| 114 | " | H. | " | 3) |
| 115 | " | —SO$_2$NHCH$_3$ | H | 1) |
| 116 | " | " | H | 2) |
| 117 | " | " | H | Na |
| 118 | " | " | H | 4) |
| 119 | " | " | H | 5) |
| 120 | " | —SO$_2$NHC$_6$H$_5$ | H | 1) |
| 121 | " | " | H | 2) |
| 122 | " | " | H | 3) |
| 123 | " | " | H | K |
| 124 | " | —SO$_2$NH(CH$_2$)$_3$OCH$_3$ | H | 1) |
| 125 | 2-ethylhexyl | —SO$_2$NH(CH$_2$)$_3$OCH$_3$ | H | 2) |
| 126 | " | " | H | 3) |

EXAMPLE 127

By a method analogous with that of any one of Examples 1–3, a mixture of 26.0 parts of 2-amino-4-(3'-methoxypropylaminosulphonyl)-phenol and 26.0 parts of 2-hydroxy-4-(3'-methoxypropylaminosulphonyl)aniline are diazotized with 52.4 parts by volume of 4N NaNO$_2$. This is then coupled with 42.8 parts of 2,4-dihydroxybenzophenone and the resulting azo dyestuff is reacted with 17.1 parts of aluminium sulphate and 15.6 parts of triacetondiamine. The reaction product is then isolated and purified. The resultant dyestuff mixture colors nitrocellulose lacquers reddish tones.

EXAMPLE 128

By a method analogous to that of Example 1, a mixture of 10.5 parts of 2-hydroxy-4-methylaminosulphonyl) aniline and 13 parts of 2-amino-4-(3'-methoxypropylamino sulphonyl) phenol are diazotized. This is then coupled with 21.4 parts of 2,4-dihydroxybenzophenone. After reaction with 8.55 parts of aluminum sulphate (water-free) and 7.75 parts of triacetonamine, a dyestuff mixture results that colors nitrocellulose red tones.

APPLICATION EXAMPLE 5 parts of the dyestuff of Example 1b in a Dissolver apparatus are stirred into 95 parts of a nitrocellulose lacquer prepared from:

- 18.8%—of Nitrocellulose A15 (in the form white flocs wetted with 35% isopropanol)
- 6.3%—an acrylic acid butyl ester polymer, a softener resin (Acronal 4F from BASF)
- 3.3%—of diphenyloctylphosphate, a softener (Santiciser 141 from Monsanto)
- 10.0%—methoxypropanol (Dowanol PM from Dow Chemical)
- 10.0%—ethoxypropanol
- 41.6%—ethanol, and
- 10.0%—ethyl acetate.

This is dissolved overnight in a rolling block. The solubility is very good.

With a 25 mm blade, a wet film of this lacquer composition is placed on aluminum foil and the lacquer is dried for 5 hours at 130° C. A bluish red lacquer coating results with good light and migration fastness properties.

The application example can be repeated using 5 parts of any one of the dyes of Examples 2–128 in place of that of Example 1b.

We claim:
1. A complex of the formula

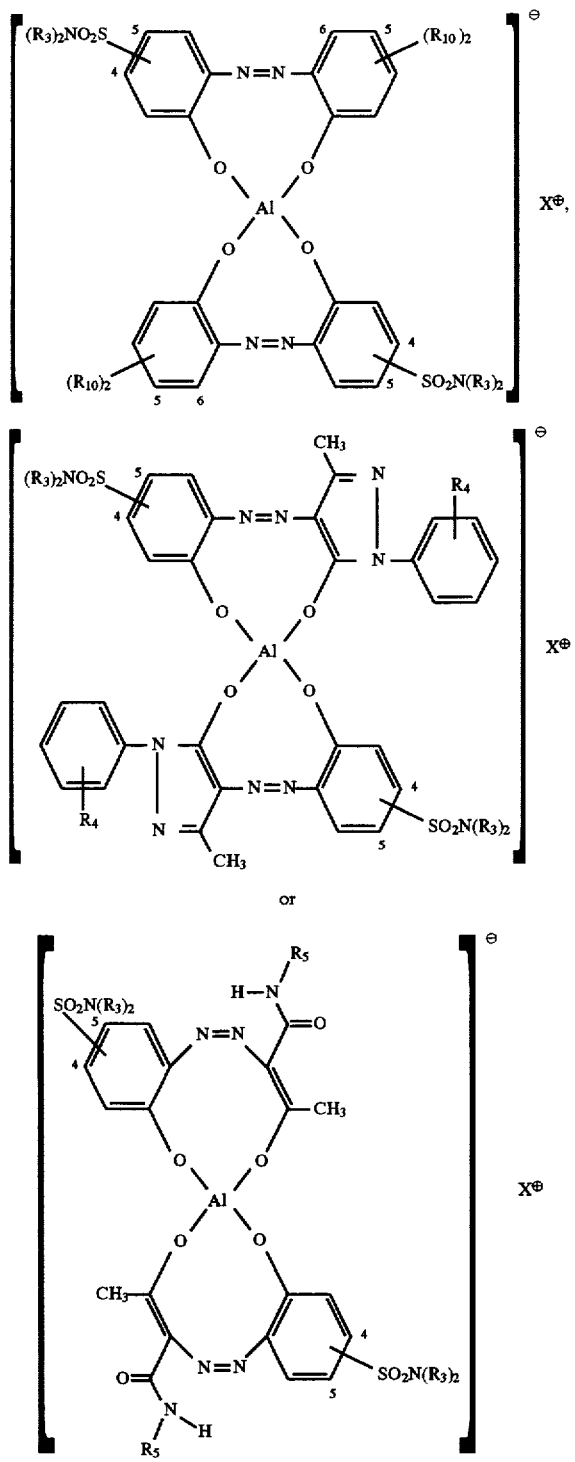

wherein each $R_3$ is independently hydrogen, $C_{1-4}$alkyl, $(C_{1-2}alkoxy)C_{2-3}$alkyl or phenyl with the proviso that both $R^3$'s attached to the same N are not hydrogen, each $R_4$ is hydrogen, halo, methyl, ethyl, methoxy or ethoxy, each $R_5$ is independently 2-ethylhexyl, phenyl or phenyl substituted by 1 to 3 substituents each of which is independently, chloro, bromo, $C_{1-4}$alkyl, $C_{1-4}$alkoxy or acetyl, each $R_{10}$ is independently hydrogen, halo, hydroxy, $C_{1-4}$alkyl, $C_{1-4}$alkoxy, acetyl, benzoyl or 4,6-bis(2',4'-dimethylphenyl)triazinyl-2, or both $R_{10}$'s attached to the same ring are ortho to each other and taken together are —CH=CH—CH=CH—, and $X^\oplus$ is a cation.

2. A complex according to claim 1 wherein
$X^\oplus$ is an alkali metal cation, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

3. A complex according to claim 1 wherein
each —$SO_2N(R_3)_2$ is 4- or 5-$SO_2NHR_3$.

4. A complex according to claim 3 wherein
each $R_5$ is independently 2-ethylhexyl; phenyl; phenyl monosubstituted by $C_{1-2}$alkoxy, chloro, bromo or methyl; phenyl disubstituted by $C_{1-2}$alkoxy or phenyl substituted by one or two $C_{1-2}$alkoxy groups and one substituent selected from chloro, bromo and methyl, and
each $R_{10}$ is independently hydrogen, hydroxy, acetyl or benzoyl.

5. A complex according to claim 1 having the formula

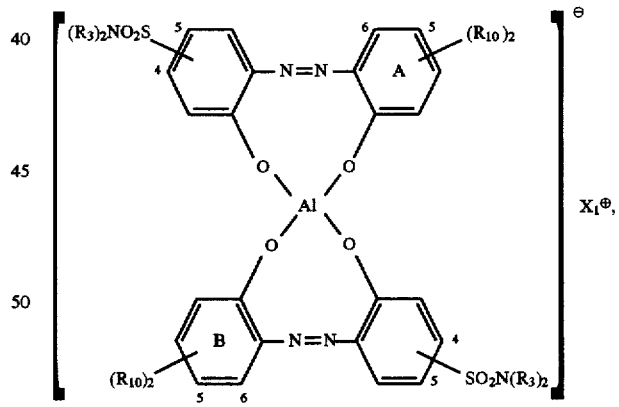

wherein
$X_1^\oplus$ is an alkali metal cation, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

6. A complex according to claim 5 wherein
$X_1^\oplus$ is sodium, potassium, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

7. A complex according to claim 5 wherein each —$SO_2N(R_3)_2$ is 4- or 5-$SO_2NHR_3$.

8. A complex according to claim 7 wherein each $R_{10}$ is independently hydrogen, hydroxy, acetyl or benzoyl.

9. A complex according to claim 7 wherein the two $R_{10}$'s attached to each of Rings A and B are in the 5- and 6-positions and taken together are —CH=CH—CH=CH—.

10. The complex according to claim 9 wherein each —$SO_2N(R_3)_2$ is 5-(3'-methoxypropyl)aminosulfonyl, and $X_1^{\oplus}$ is 4-amino-2,2,6,6-tetramethylpiperidinium.

11. A complex according to claim 1 having the formula

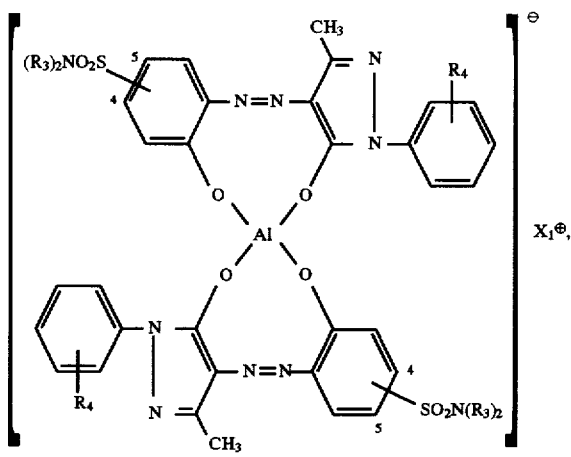

wherein $X_1^{\oplus}$ is an alkali metal cation, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

12. A complex according to claim 11 wherein $X_1^{\oplus}$ is sodium, potassium, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

13. A complex according to claim 11 wherein each —$SO_2N(R_3)_2$ is 4- or 5-$SO_2NHR_3$.

14. The complex according to claim 13 wherein each $R_4$ is hydrogen.

each —$SO_2N(R_3)_2$ is 5-methylaminosulfonyl, and $X_1^{\oplus}$ is 4-amino-2,2,6,6-tetramethylpiperidinium.

15. A complex according to claim 1 having the formula

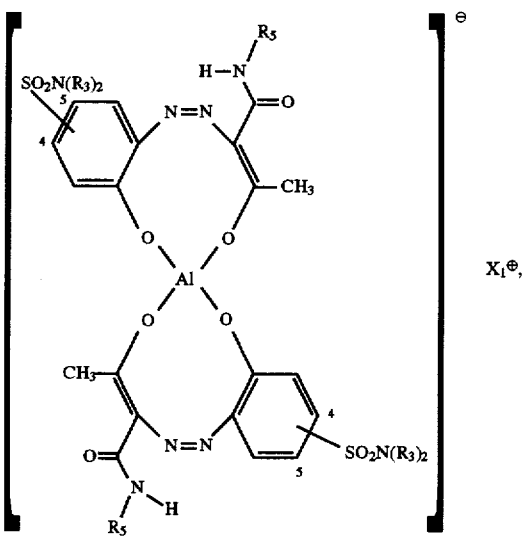

wherein $X_1^{\oplus}$ is an alkali metal cation, ammonium, $C_{1-4}$alkyl)ammonium, di($C_{1-4}$alkyl)ammonium, tri($C_{1-4}$alkyl)ammonium, 4-amino2,2,6,6-tetramethylpiperidinium, 4-hydroxy-2,2,6,6-tetramethylpiperidinium or 4-oxo-2,2,6,6-tetramethylpiperidinium.

16. A complex according to claim 5 wherein $X_1^{\oplus}$ is sodium, potassium, ammonium, $C_{1-4}$alkylammonium, di($C_{1-4}$alkyl)ammonium, tri($C_{1-4}$alkyl)ammonium, 4-amino-2,2,6,6-tetramethylpiperidinium, 4-hydroxy-2,2,6,6-tetramethylpiperidinium or 4-oxo-2,2,6,6-tetramethylpiperidinium.

17. A complex according to claim 16 wherein each —$SO_2N(R_3)_2$ is 4- or 5-$SO_2NHR_3$.

18. A complex according to claim 17 wherein each $R_5$ is independently 2-ethylhexyl; phenyl; phenyl monosubstituted by $C_{1-2}$alkoxy, chloro, bromo or methyl; phenyl disubstituted by $C_{1-2}$alkoxy or phenyl substituted by one or two $C_{1-2}$alkoxy groups and one substituent selected from chloro, bromo and methyl.

19. A complex according to claim 2 wherein $X_1^{\oplus}$ is 4-amino-2,2,6,6-tetramethylpiperidinium, 4-hydroxy-2,2,6,6-tetramethylpiperidinium or 4-oxo-2,2,6,6-tetramethylpiperidinium.

20. A complex according to claim 6 wherein $X_1^{\oplus}$ is 4-amino-2,2,6,6-tetramethylpiperidinium, 4-hydroxy-2,2,6,6-tetramethylpiperidinium or 4-oxo-2,2,6,6-tetramethylpiperidinium.

21. A complex according to claim 12 wherein $X_1^{\oplus}$ is 4-amino-2,2,6,6-tetramethylpiperidinium, 4-hydroxy-2,2,6,6-tetramethylpiperidinium or 4-oxo-2,2,6,6-tetramethylpiperidinium.

22. A complex according to claim 16 wherein $X_1^{\oplus}$ is 4-amino-2,2,6,6-tetramethylpiperidinium, 4-hydroxy-2,2,6,6-tetramethylpiperidinium or 4-oxo-2,2,6,6-tetramethylpiperidinium.

23. A substrate to which a complex according to claim 1 has been applied.

24. A lacquer comprising a complex according to claim 1.

* * * * *